US012746503B1

(12) United States Patent
Mccarthy et al.

(10) Patent No.: US 12,746,503 B1
(45) Date of Patent: Sep. 29, 2026

(54) SYSTEMS AND METHODS FOR COLLECTING FATS, OILS, AND GREASE FROM UPDRAFT VENTILATORS

(71) Applicants: Martin Franklin Mccarthy, Charlotte, NC (US); Sean Thomas Mccarthy, Charlotte, NC (US)

(72) Inventors: Martin Franklin Mccarthy, Charlotte, NC (US); Sean Thomas Mccarthy, Charlotte, NC (US)

( * ) Notice: Subject to any disclaimer, the term of this patent is extended or adjusted under 35 U.S.C. 154(b) by 0 days.

(21) Appl. No.: 19/557,262

(22) Filed: Mar. 5, 2026

Related U.S. Application Data

(60) Provisional application No. 63/888,662, filed on Sep. 26, 2025.

(51) Int. Cl.
*B01D 53/14* (2006.01)
*B01D 46/00* (2022.01)
(Continued)

(52) U.S. Cl.
CPC ..... *B01D 53/0415* (2013.01); *B01D 46/0005* (2013.01); *B01D 53/14* (2013.01); *F24C 15/2035* (2013.01); *B01D 2253/20* (2013.01); *B01D 2257/702* (2013.01); *B01D 2258/06* (2013.01)

(58) Field of Classification Search
CPC .. B01D 53/14; B01D 46/0005; F24C 15/2035
See application file for complete search history.

(56) References Cited

U.S. PATENT DOCUMENTS 3,678,662 A 7/1972 Grote
3,862,963 A 1/1975 Hoshi et al.
(Continued)

FOREIGN PATENT DOCUMENTS

CA 2777850 A1 11/2013
CA 2931443 A1 11/2017
(Continued)

OTHER PUBLICATIONS

Mathavan, G.N. et al. 1989. Use of peat in the treatment of oily waters. Water, Air, and Soil Pollution 45: 17-26. (Year: 1989).
(Continued)

*Primary Examiner* — Robert A Hopkins
(74) *Attorney, Agent, or Firm* — Shumaker, Loop & Kendrick, LLP

(57) ABSTRACT

A method of capturing and disposing of fats, oil and/or grease includes: positioning an updraft ventilator in flow communication with a source of airflow having fats, oils, and/or grease entrained therein; providing a porous container formed of a porous fabric filled with an absorbent material capable of absorbing a quantity of the fats, oil, and/or grease through the porous fabric of the porous container; placing the porous container and the absorbent material contained therein in an enclosure of the updraft ventilator; operating the updraft ventilator to draw the airflow having fats, oils, and/or grease entrained therein through the enclosure such that it contacts the porous container; allowing the porous container to fill up with at least one of fats, oil, and/or grease; and after a period of time, removing the porous container from the updraft ventilator.

19 Claims, 7 Drawing Sheets

(51) Int. Cl.
*B01D 53/04* (2006.01)
*F24C 15/20* (2006.01)

(56) References Cited

U.S. PATENT DOCUMENTS

| | | | |
|---|---|---|---|
| 4,378,229 | A | 3/1983 | Leen |
| 4,925,343 | A | 5/1990 | Raible et al. |
| 5,264,134 | A | 11/1993 | McCamy |
| 5,716,840 | A | 2/1998 | Kahler |
| 5,744,406 | A | 4/1998 | Novak |
| 5,820,762 | A | 10/1998 | Bamer |
| 6,010,558 | A | 1/2000 | Ackland |
| 6,365,214 | B1 | 4/2002 | Kirk |
| 6,508,849 | B1 | 1/2003 | Comas |
| 6,517,709 | B1 | 2/2003 | Cardwell et al. |
| 6,818,027 | B2 | 11/2004 | Murcia |
| 7,354,516 | B1 | 4/2008 | Young et al. |
| 7,597,727 | B1 | 10/2009 | Morris |
| 10,066,178 | B2 | 9/2018 | Tanel |
| 10,882,758 | B2 | 1/2021 | Sands |
| 11,339,341 | B1 | 5/2022 | McCarthy |
| 11,529,571 | B2 | 12/2022 | McCarthy |
| 11,535,804 | B2 | 12/2022 | McCarthy |
| 11,535,805 | B2 | 12/2022 | McCarthy |
| 11,535,812 | B2 | 12/2022 | McCarthy |
| 2001/0023007 | A1 | 9/2001 | Leriget |
| 2003/0079400 | A1 | 5/2003 | Weissman et al. |
| 2003/0121802 | A1 | 7/2003 | MacQuoid |
| 2004/0035046 | A1 | 2/2004 | Weissman et al. |
| 2004/0161606 | A1 | 8/2004 | Bilkey |
| 2005/0268542 | A1 | 12/2005 | Weissman et al. |
| 2006/0000767 | A1 | 1/2006 | Trauger et al. |
| 2006/0156621 | A1 | 7/2006 | Kraus et al. |
| 2006/0230673 | A1 | 10/2006 | Barford et al. |
| 2007/0029247 | A1 | 2/2007 | Alpert |
| 2007/0169409 | A1 | 7/2007 | Chang |
| 2009/0014087 | A1 | 1/2009 | Fevag |
| 2009/0200241 | A1 | 8/2009 | Harman et al. |
| 2011/0000854 | A1 | 1/2011 | Nichols et al. |
| 2012/0006761 | A1 | 1/2012 | Parker et al. |
| 2012/0251597 | A1 | 10/2012 | Gupta et al. |
| 2012/0311972 | A1 | 12/2012 | Hunter |
| 2013/0056369 | A1 | 3/2013 | Jorgensen |
| 2014/0087315 | A1 | 3/2014 | Doyle et al. |
| 2015/0322361 | A1 | 11/2015 | Creutzmann |
| 2017/0081251 | A1 | 3/2017 | Townsend |
| 2017/0226440 | A1 | 8/2017 | Fandrich et al. |
| 2019/0017605 | A1 | 1/2019 | Miller et al. |
| 2019/0040593 | A1 | 2/2019 | Tetrault et al. |
| 2021/0002571 | A1 | 1/2021 | Zeitler et al. |
| 2021/0070640 | A1 | 3/2021 | Yaman et al. |
| 2023/0183602 | A1 | 6/2023 | McCarthy |

FOREIGN PATENT DOCUMENTS

| | | | | |
|---|---|---|---|---|
| CN | 110041907 | A | | 7/2019 |
| CN | 213178489 | U | * | 5/2021 |
| CN | 213253724 | U | | 5/2021 |
| DE | 102009013985 | A1 | | 9/2010 |
| DE | 102012104574 | A1 | | 12/2013 |
| DE | 202014001312 | U1 | | 3/2014 |
| DE | 202019003324 | U1 | | 8/2019 |
| EP | 2216387 | A1 | | 8/2010 |
| EP | 3750853 | A1 | | 12/2020 |
| FR | 2989384 | A1 | | 10/2013 |
| GB | 2368261 | A | | 5/2002 |
| GB | 2389858 | B | | 1/2005 |
| JP | 2000225309 | A | * | 8/2000 |
| JP | 2014151317 | A | | 8/2014 |
| KR | 10-1953361 | B1 | | 2/2019 |
| SU | 1667805 | A1 | | 8/1991 |
| WO | 2007009249 | A1 | | 1/2007 |
| WO | 2008141752 | A1 | | 11/2008 |
| WO | 2009120842 | A2 | | 10/2009 |
| WO | 2012062324 | A1 | | 5/2012 |
| WO | 2013108223 | A1 | | 7/2013 |
| WO | 2014068316 | A1 | | 5/2014 |
| WO | 2017152229 | A1 | | 9/2017 |
| WO | 2019145944 | A1 | | 8/2019 |

OTHER PUBLICATIONS

Pintor, A.M.A. 2016. Oil and grease removal from wastewaters. Sorption treatment as an alternative to state-of-the-art technologies. A critical review. Chemical Engineering Journal 297 (20216) 229-255 (Year: 2016).

Olga et al., Cleanup of Water Surface from Oil Spills Using Natural Sorbent Materials, National Research Tomsk Polytechnic University, Procedia Chemistry 10 (2014), pp. 145-150.

City of Dothan Alabama, Fats, Oils and Grease (FOG) Science, dated Oct. 27, 2020, Retrieved from https:/www.dothan.org/DocumentCenterNiew/3032/FOG--Science?bidld, 7 pages.

Finney et al., 2009 "Fuel pelletization with a binder: part I—identification of a suitable binder for spent mushroom compost-coal tailing pellets". Energy & Fuels 23, 3195-3202. (Year: 2009).

Abomohra et al., 2020 "Potential of fat, oil and grease (FOG) for biodiesel production: A critical review on the recent progress and future perspectives" Progress in Energy and Combustion Science 81 (Year: 2020).

Hendrasarie et al., 2021 "Combining grease trap and Moringa Oleifera </i> as adsorbent to treat wastewater restaurant" South African Journal of Chemical Engineering 37 (2021) 196-205 (Year: 2021).

Anonymous, "Peat Sorb Safety Data Sheet (SDS)" Cited in EP22776410.7; provided herein per MPEP 609.04(a)III.

* cited by examiner

SYSTEMS AND METHODS FOR COLLECTING FATS, OILS, AND GREASE FROM UPDRAFT VENTILATORS

BACKGROUND

The present invention relates to apparatus and methods for collection and disposal of fats, oil and grease.

Fats, Oil, and Grease ("FOG") wastes are generated at food service establishments as byproducts from food preparation, and cleaning activities for pans, dishes, utensils and other surfaces. One type of FOG is yellow grease that is the byproduct of deep frying, and often captured in large containers, then ultimately sold into the reuse market. Another type of FOG are the fats, oil, and grease that are washed down the sink and floor drains into the grease trap. These fats, oil, and grease are a result of cleaning pans, plates, utensils and other grease-laden surfaces in the food service establishment. Yet another type of FOG is the fats, oil, and grease entrained in exhaust vent airflows.

Food service establishments typically use exhaust ventilation equipment above cooking stoves to remove odors, waste material, and flammable products generated as a result of cooking. FIG. 1 illustrates an exemplary ventilation system for a cooktop 1 disposed in a restaurant kitchen 2. A vent hood 3 is positioned over the cooktop 1. The vent hood 3 is coupled to an exhaust duct 4 which penetrates the roof structure 5 of the kitchen 2. A powered ventilator 100 including an electrically-driven fan is mounted on the roof structure 5 and coupled in flow communication with the exhaust duct 4. The powered ventilator 100 is effective to draw airflow through the exhaust duct 4 and discharge it into the surrounding environment. This type of powered ventilator is commercially referred to as an "updraft fan" or "updraft ventilator".

It will be understood that the airflow extracted by the updraft ventilator 100 (i.e. the airflow generated by the cooktop 1) includes entrained vapors, particles, and/or fluid droplets of fats, oils, and grease. In prior art practice, these materials can become deposited on the surfaces of the updraft ventilator 100. One problem with prior art updraft ventilators 100 is that these deposits can represent a fire hazard and can increase the time, cost, and effort required to maintain the updraft ventilator 100. Furthermore, experience evidences that FOG gets spread on the Food Service Establishment roof to the degradation of the roof and the increased likelihood of FOG runoff or the incidence of fire from electrical spark

SUMMARY

Disclosed herein is an updraft ventilator equipped with a porous container containing an absorbent material capable of capturing FOG from an airflow.

According to one aspect of the technology described herein, a method of capturing and disposing of fats, oil and/or grease includes: positioning an updraft ventilator in flow communication with a source of airflow having fats, oils, and/or grease entrained therein; providing a porous container formed of a porous fabric filled with an absorbent material capable of absorbing a quantity of the fats, oil, and/or grease through the porous fabric of the porous container; placing the porous container and the absorbent material contained therein in an enclosure of the updraft ventilator; operating the updraft ventilator to draw the airflow having fats, oils, and/or grease entrained therein through the enclosure such that it contacts the porous container; allowing the porous container to fill up with at least one of fats, oil, and/or grease; and after a period of time, removing the porous container from the updraft ventilator.

According to another aspect of the technology described herein, a apparatus for capturing and disposing of fats, oil and/or grease includes: an updraft ventilator in flow communication with a source of airflow having fats, oils, and/or grease entrained therein; the updraft ventilator having an enclosure including a curb cap, a hood band positioned above the curb cap, and a wind band surrounding and spaced away from the hood band; collectively, the lower part of the hood band and the wind band define a duct; and collectively, a lower part of the wind band and the curb cap define a bowl positioned below the duct; and a porous container disposed within the enclosure, the porous container formed of a porous fabric filled with an absorbent material capable of absorbing a quantity of the fats, oil, and/or grease through the porous fabric of the porous container.

DETAILED DESCRIPTION

Figure 1:
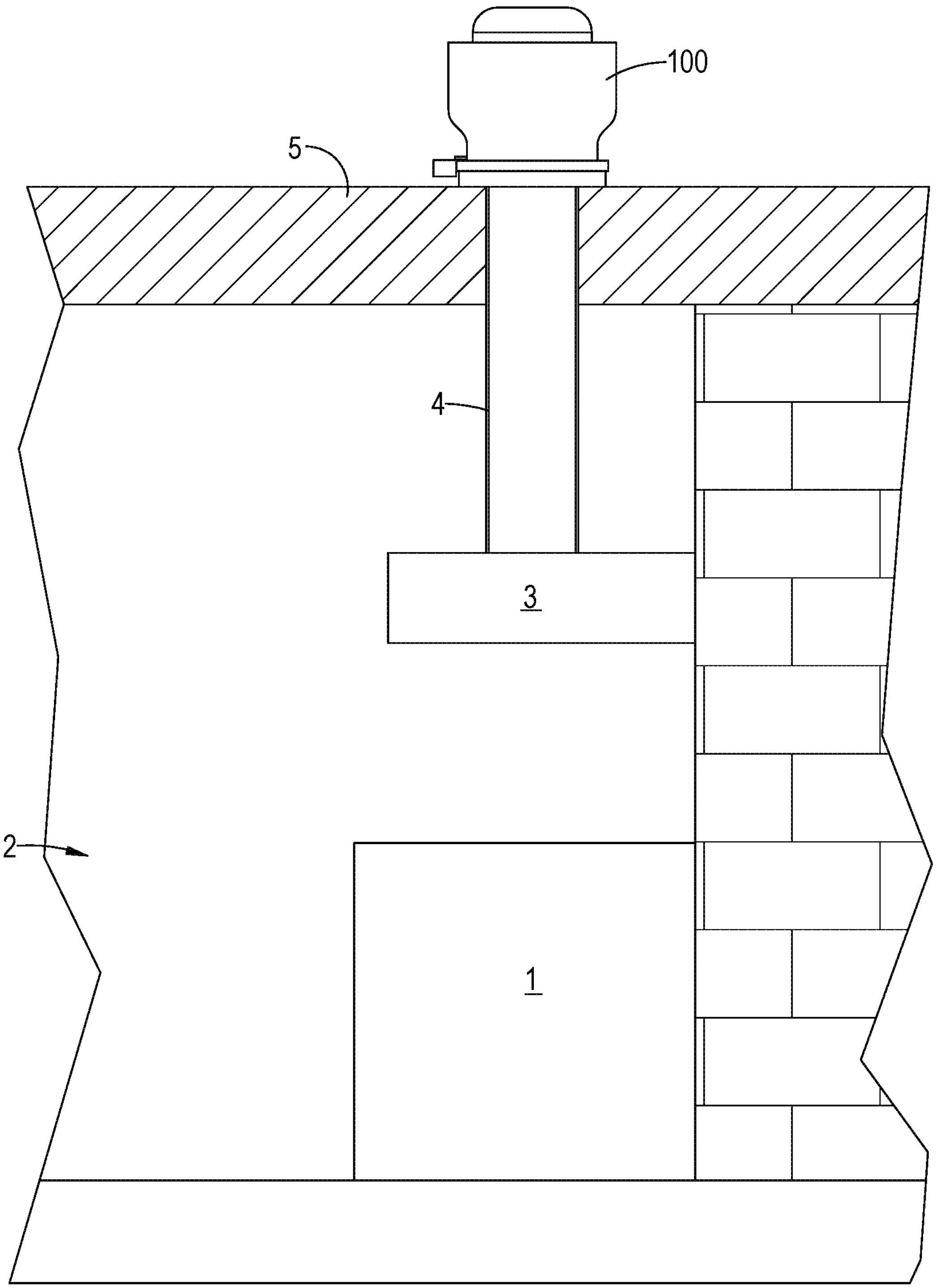
FIG. 1 is a schematic sectional view of a kitchen and roof structure including a powered ventilator.
Figure 2:
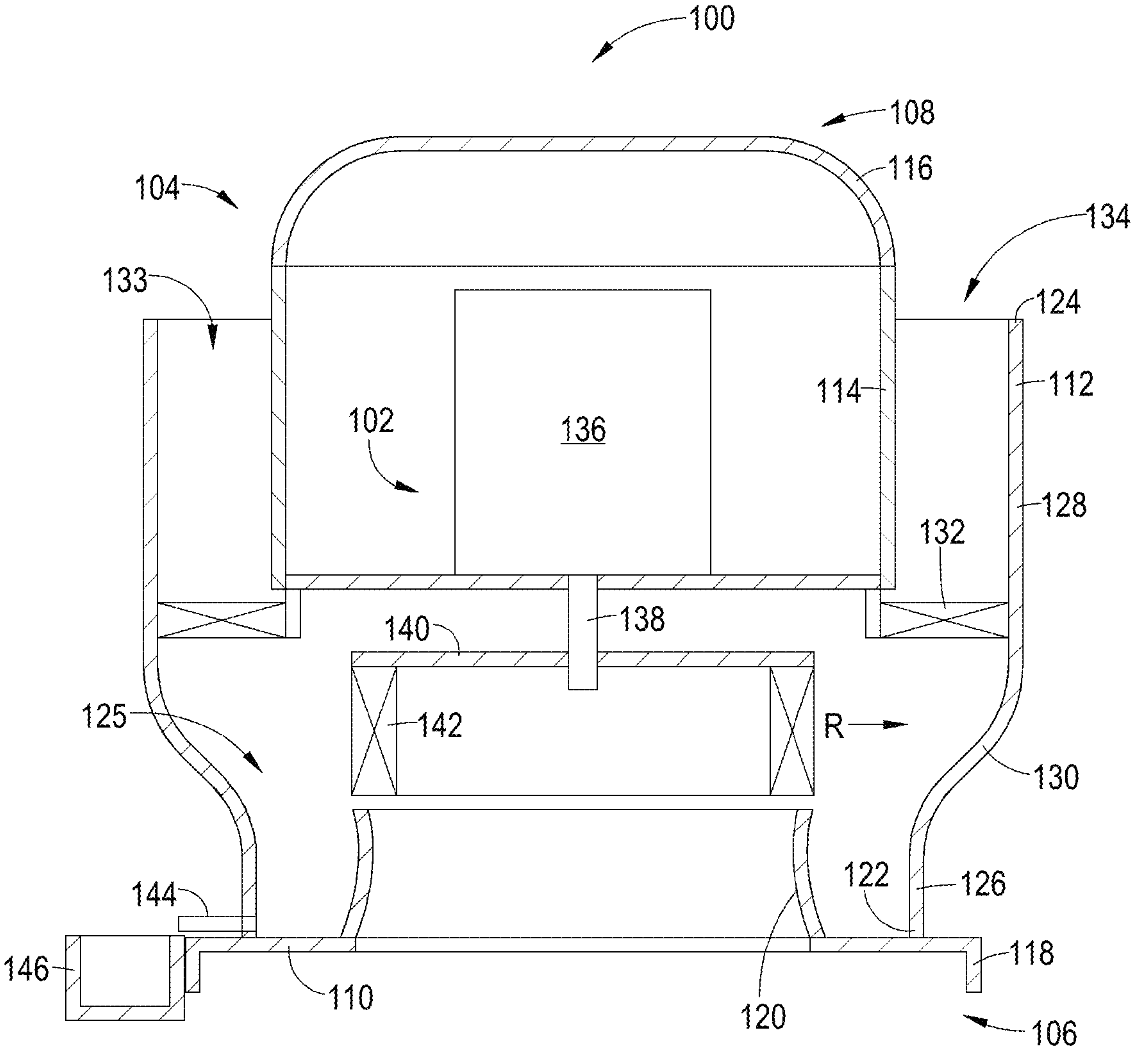
FIG. 2 is a sectional view of a exemplary power ventilator.

Referring now to the drawings, FIG. 2 illustrates an exemplary updraft ventilator 100. It comprises a fan assembly 102 mounted in an enclosure 104.

The enclosure 104 extends between a bottom end 106 and a top end 108. It includes, from bottom to top, a curb cap 110, a wind band 112, a hood band 114, and a motor cover 116.

The curb cap 110 is a plate-like element configured to be mounted to a surface such as a building roof. It may include a downturned flange 118 to provide stiffness and facilitate mounting. The curb cap 110 defines an inlet 120 of the updraft ventilator 100. In the illustrated example, the inlet

120 comprises a central opening in the curb cap 110 surrounded by an annular wall which may be configured in a Venturi shape. The curb cap 110 may be made from a durable material such as sheet metal.

The wind band 112 is an annular element extending between a first end 122 and a second end 124. The first end 122 abuts the curb cap 110. The wind band 112 includes a generally cylindrical lower portion 126 having a first diameter, a generally cylindrical upper portion 128 having a second diameter larger than the first diameter, and a transition portion 130 extending between the lower portion 126 and the upper portion 128. Smooth radius transitions may be provided between the portions. The wind band 112 may be made from a durable material such as sheet metal. Collectively, the lower part of the wind band 112 and the curb cap 110 define a volume which may be referred to as a "bowl" 125.

A support frame 132 is disposed on top of the curb cap 110, inside the wind band 112.

The hood band 114 is an annular element disposed above the support frame 132. It may be made from a durable material such as sheet metal. The hood band 114 is readily spaced away from the second end 124 of the wind band 112 to cooperatively define a duct 133 positioned above and communicating with the bowl 125. The duct 133 terminates in an outlet 134 of the updraft ventilator.

While several elements of the enclosure 104 are described as being "annular", it will be understood that they are not limited to having arcuate or circular shapes, and other shapes having a closed perimeter may be substituted therefore.

The fan assembly 102 is disposed inside the hood band 114. The fan assembly 102 includes a prime mover such as an electric motor and appropriate driving equipment, such as shafts, bearings, pulleys, gears, and/or chains. In one example, the fan assembly 102 includes an electric motor 136 which drives a fan shaft 138 directly.

A fan wheel 140 is mounted to the fan shaft 138 so that it can be rotated by the electric motor. The fan wheel 140 has a diameter measured perpendicular to the fan shaft axis, and a height measured parallel to the fan shaft axis. In commercially-available examples, the fan wheel diameter may be in the range of about 9 inches to about 48 inches. The fan wheel 140 is a hollow annular element including a radial array of impeller vanes 142.

The motor cover 116 is removably secured to the hood band 114 and protects the fan assembly 102 from environmental exposure.

In operation, the electric motor 136 or other prime mover rotates the fan shaft 138 which in turn spins the fan wheel 140. This functions as a centrifugal fan, discharging airflow in a radially outward direction "R", resulting in a pressure reduction at an inlet face of the fan wheel 140. Airflow is drawn through the central inlet 120 and passes through the fan wheel 140 where it is directed radially outward. It strikes the interior surface of the wind band 112 and is directed upward. Finally, it exits the outlet 134 of the updraft ventilator.

As installed, the updraft ventilator 100 is exposed to the environment, and rainwater can enter the outlet 134. Accordingly, the wind band 112 is provided with a drain tube 144 that permits liquid to flow away from the bowl 125 by gravity.

The updraft ventilator 100 may be provided with a catchment trough 146 which is a vessel positioned to receive fluids flowing out of the drain tube 144. For example, it may be adjacent to the curb cap 110.

In typical restaurant applications, the air passing through the updraft ventilator 100 contains suspended FOG as described above. When discharged by the fan wheel 140, this material strikes the interior surface of the wind band 112. Some of the material is deposited on the surface, and some of the material flows down by gravity into the bowl 125. Some of the material flows out of the drain tube 144 into the catchment trough 146. After substantial buildup of FOG, or when rainwater builds up in the catchment trough 146, the catchment trough 146 can overflow, spilling the FOG to the roof structure.

According to the principles of the present invention, the updraft ventilator 100 may be provisioned with a porous container including an absorbent material for the purpose of separating FOG from an airflow. Various types of porous containers may be used. Several examples are described below.

Figure 3:
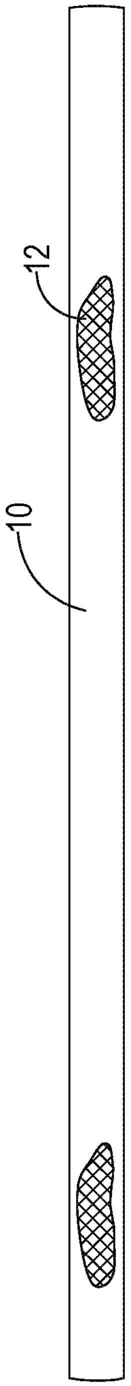
FIG. 3 is a side view of a geotextile container in tube form according to an embodiment of the invention.
Figure 4:
FIG. 4 is an end view of the container of FIG. 3.

A container in the form of a tube 10 for use in the present invention is shown in FIGS. 3 and 4. The tube 10 may be constructed according to many suitable constructions, but one construction comprises an elongate tube 10 that is formed of a geotextile fabric 12 that may be constructed by circular knitting, flat knitting, weaving, non-woven formation or any other fabric construction having a multitude of openings through the thickness of the fabric 12. The fabric 12 may be seamed along its length to form the tube 10.

The tube 10 may be constructed of a synthetic, biodegradable or natural material. The fabric 12 of the tube 10 may be constructed of any suitable natural or biodegradable/synthetic yarn, for example, with a natural fiber such as cotton, hemp, ramie, jute or similar material because of its biodegradable characteristics, with apparent opening size (AOS) on the order of 0.25 to 0.5 mm depending on the size of the absorbent material. The empty tube 10 may be any suitable length and diameter, for example, approximately 5 to 15 cm in cross-sectional diameter and approximately 1 m to 3 m in length, or longer depending on the size of the updraft ventilator 100. As manufactured, the tube 10 is preferably closed at one end and filled from the opposite, open end. The open end of the filled tube 10 may be closed with any suitable closure, such as stitching, clips or tied off with cord.

One or more coatings may be applied to the fabric 12 to prevent penetration of the fabric 12 surface by water or aqueous salts thereby allowing the fabric 12 substrate to be non-absorbent for water or soluble salts.

Figure 5:
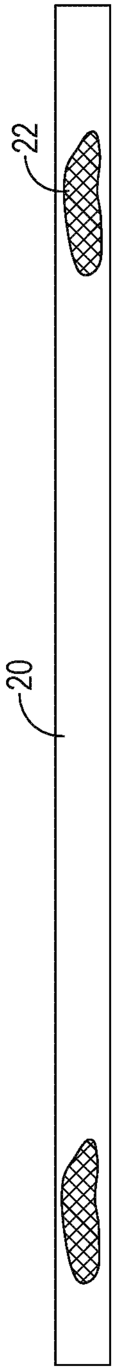
FIG. 5 is a side view of a geotextile container in mat form according to an embodiment of the invention.
Figure 6:
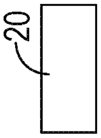
FIG. 6 is an end view of the container of FIG. 5.

Referring now to FIGS. 5 and 6, a container in the form of a mat 20 for use in the present invention is shown. The mat 20 may be constructed according to many suitable constructions, but one construction comprises a rectangular "box" shape that is formed of a geotextile fabric 22 that may be constructed by circular knitting, flat knitting, weaving, non-woven formation or any other fabric construction having a multitude of openings through the thickness of the fabric 22. The fabric 22 is preferably seamed along its length and width to form the mat 20. The mat 20 may be constructed of a synthetic, biodegradable or natural material. The fabric 22 of the mat 20 may be constructed of any suitable natural or biodegradable/synthetic yarn, for example, a natural fiber such as cotton, hemp, ramie, jute or similar material because of its biodegradable characteristics, with apparent opening size (AOS) on the order of 0.25 to 0.5 mm depending on the size of the absorbent material. The empty mat 20 may be any suitable length, width and height, for example, 1 m to 3 m long, or longer, with a cross-sectional width of approximately 15 cm to 25 cm, and a thickness (cross-sectional height) of approximately 5 cm, depending on the size of the updraft ventilator 100. As manufactured, the mat 20 is preferably closed at one end and filled from the opposite, open end. The open end of the filled mat 20 may be closed with any suitable closure, such as stitching, clips, or snaps. The mat 20 may be seamed in such manner as to create individual compartments within the mat 20.

One or more coatings may be applied to the fabric 22 to prevent penetration of the fabric 22 surface by water or aqueous salts thereby allowing the fabric 22 substrate to be non-absorbent for water or soluble salts.

Figure 7:
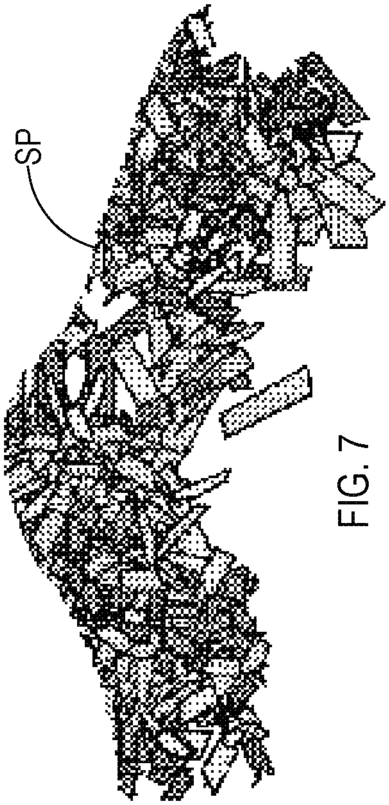
FIG. 7 is a schematic view of a quantity of absorbent material.

FIG. 7 illustrates FOG absorbent material "SP" to be filled into the tube 10 or the mat 20.

Two products suitable for use in the FOG tube described in this application are "Dry All" wood fiber and Sphagnum peat moss processed and sold by Integrity Absorbent Products. Similar products are available from other suppliers. In particular, the peat moss product is an all organic hydrocarbon absorbent, manufactured from large fiber sphagnum peat moss. The manufacturing process produces a product which becomes both oleophilic, absorbing hydrocarbons and hydrophobic, i.e., repelling water. Due to its fibrous structure and processing, peat absorbs hydrocarbons quickly on contact by virtue of its wicking capillary action and encapsulates oil on contact. Peat absorbs, on average, eight times its weight. This volume will vary based on the hydrocarbon being absorbed and the temperature. Another suitable material is mushroom compost.

The container filled with absorbent material such as the tube 10 or mat 20 described above may be disposed in an updraft ventilator 100 to absorb FOG entrained in the airflow passing therethrough. Examples of such installations will be described with respect to FIGS. 8-13.

Figure 9:
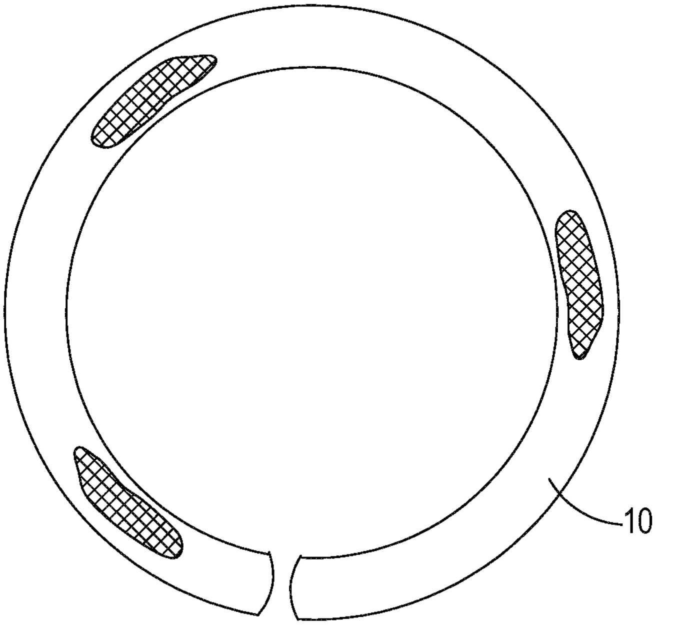
FIG. 9 is a top plan view of a tube filled with absorbent material formed into an arcuate shape.
Figure 8:
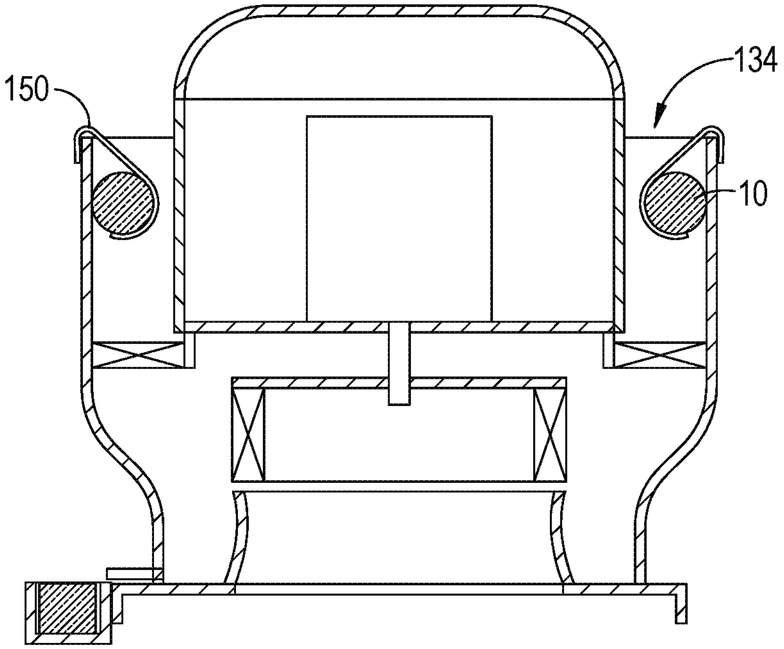
FIG. 8 is a cross-sectional view of an updraft ventilator having a tube filled with absorbent material disposed therein.

FIG. 8 illustrates a tube 10 as described above positioned between the wind band 112 and the hood band 114 of an updraft ventilator 100, near the outlet 134. To install the tube 10, it may be formed into an arcuate shape is shown in FIG. 9. Optionally, retention devices such as the illustrated clips 150, hooks, brackets, or sections of wire or cord may be used to retain the tube 10 in position. In the example shown, the clip 150 engages the upper edge of the wind band 112 and the tube 10. Alternatively, the tube 10 could be placed lower in the updraft ventilator 100. For example, it could be positioned in the bowl 125, possibly even on top of the curb cap 110. In any case, the tube 10 should be placed such that it is exposed to FOG during operation, but at the same time it does not unacceptably affect the airflow performance of the updraft ventilator 100. This may be achieved through careful selection of the size, shape, and position of the tube 10.

Figure 11:
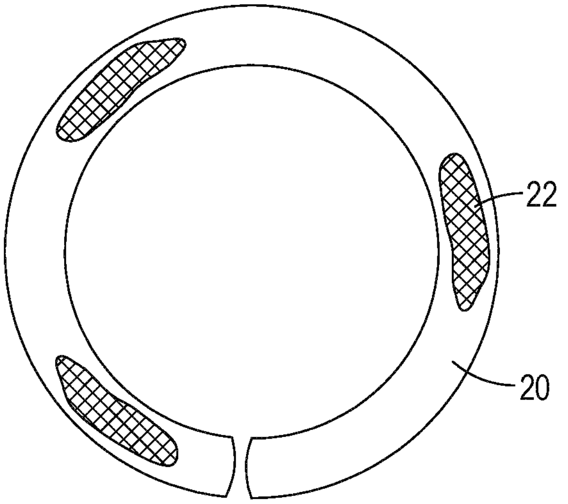
FIG. 11 is a top plan view of a mat filled with absorbent material formed into an arcuate shape.
Figure 10:
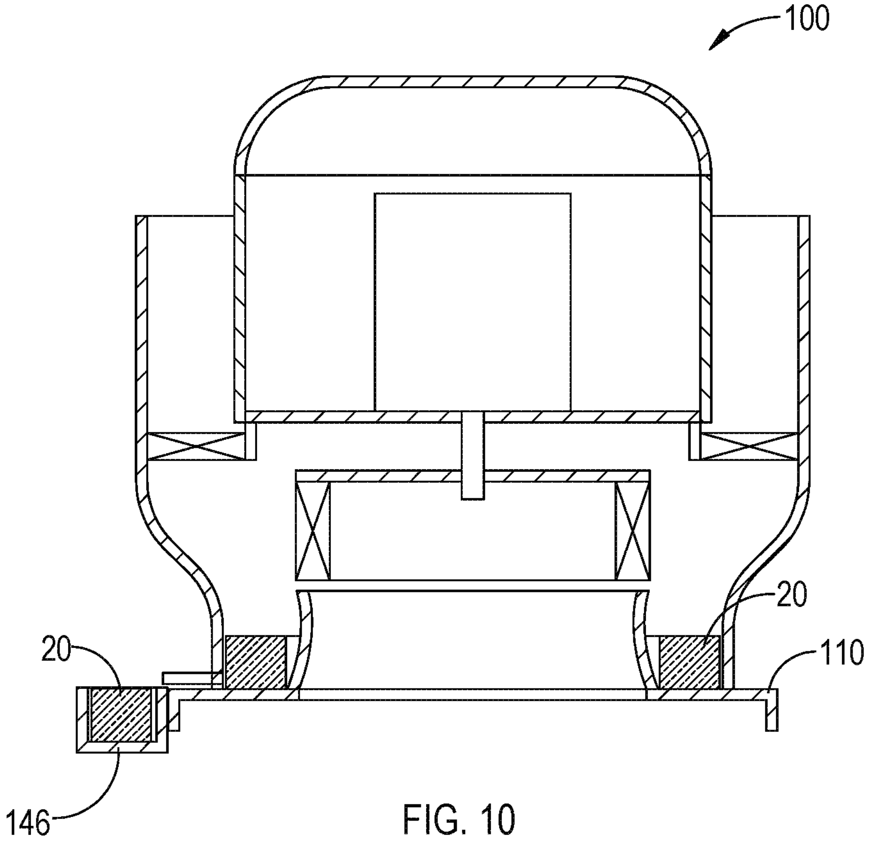
FIG. 10 is a cross-sectional view of an updraft ventilator having a mat filled with absorbent material disposed therein.

FIG. 10 illustrates a mat 20 as described above positioned in an updraft ventilator 100, on top of the curb cap 110. To install the mat 20, it may be formed into an arcuate shape as shown in FIG. 11.

Figure 13:
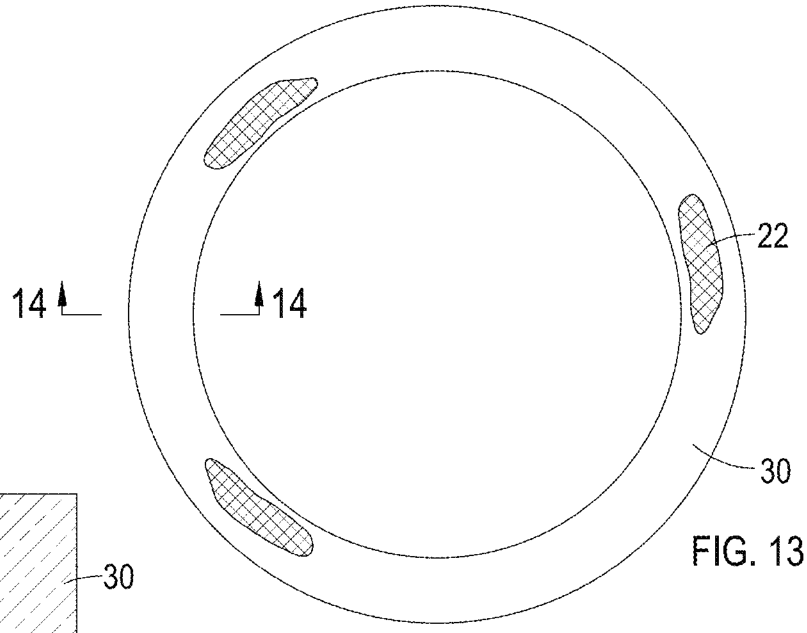
FIG. 13 is a top plan view of a tube filled with absorbent material formed into a ring shape.
Figure 14:
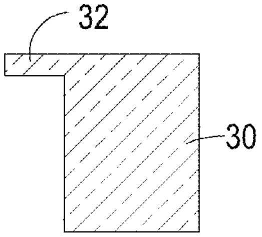
FIG. 14 is a sectional view taken along lines 14-14 of FIG. 13.
Figure 12:
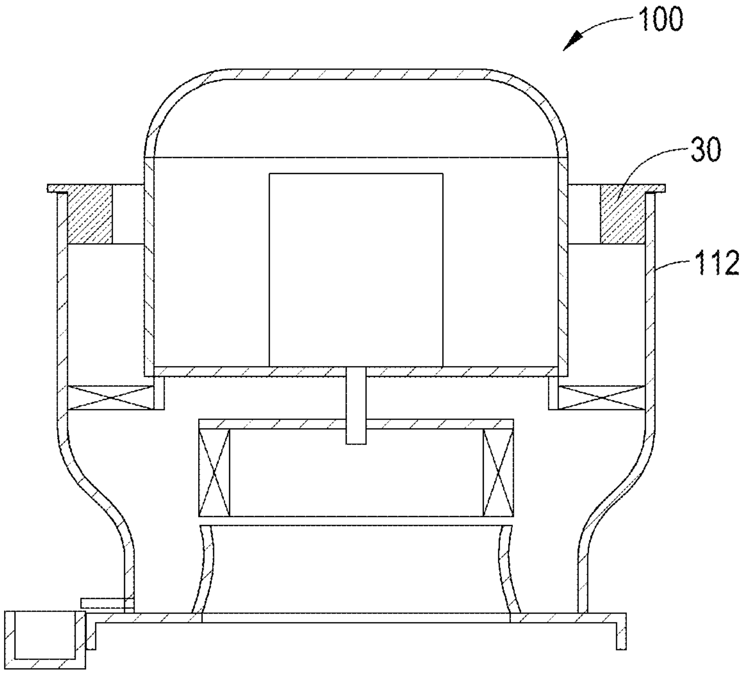
FIG. 12 is a cross-sectional view of an updraft ventilator having a ring filled with absorbent material disposed therein.

FIGS. 12-14 illustrate an alternative porous container in the form of a ring 30 for use in the present invention. The ring 30 may may have similar overall construction to the tube 10 or the mat 20 described above, and may be formed of a geotextile fabric 22 and filled with absorbent material as elsewhere described herein. The ring 30 may have a diameter selected for a snug fit in the wind band 112 and has shown in FIG. 14, the ring 30 may have a cross-sectional shape that incorporates a lip or flange 32. This allows the ring 30 to be placed in the duct 133 with the lip or flange 32 suspending the ring 30. This configuration permits easy installation and removal of the ring 30.

With the tube 10, mat 20, or ring 30 in position as described above, it will be exposed to airflow during operation of the updraft ventilator 100. As previously noted, this airflow contains entrained FOG. As the airflow contacts the tube 10, mat 20, or ring 30, the FOG will be absorbed into the absorbent material SP. This has the technical effect and advantage of reducing the amount of FOG that is discharged into the environment, and/or to the roof surface, and/or adheres to the surfaces of the updraft ventilator 100. When the updraft ventilator 100 is serviced, the tube 10, mat 20, or ring 30 can be removed and replaced with a clean tube 10, mat 20, or ring 30. During servicing, it is expected that the amount of cleaning of the updraft ventilator 100 will be greatly reduced compared to prior practices.

Furthermore, since the updraft ventilator 100 is exposed to rainwater, the tube 10, mat 20, or ring 30 will selectively absorb FOG while allowing water to pass through. This will reduce contamination of rainwater runoff from the updraft ventilator 100 as compared to prior art practices.

In addition to or as an alternative to the tube 10, mat 20, or ring 30 positioned inside the airflow path of the updraft ventilator 100, a tube 10 or mat 20 may be positioned inside the catchment trough 146. This is shown, for example in FIG. 10. This catchment trough 146 is also exposed to rainwater in the tube 10 or mat 20 will selectively absorb FOG while allowing the water to flow over the side of the catchment trough 146. This will reduce contamination of rainwater runoff.

Figure 16:
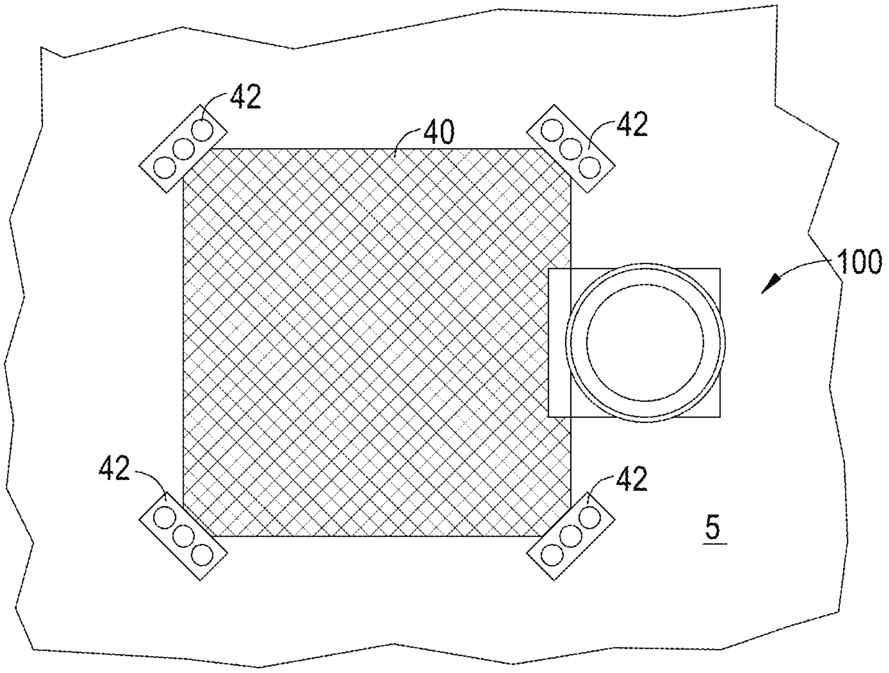
FIG. 16 is a top view of the roof structure of FIG. 15.
Figure 15:
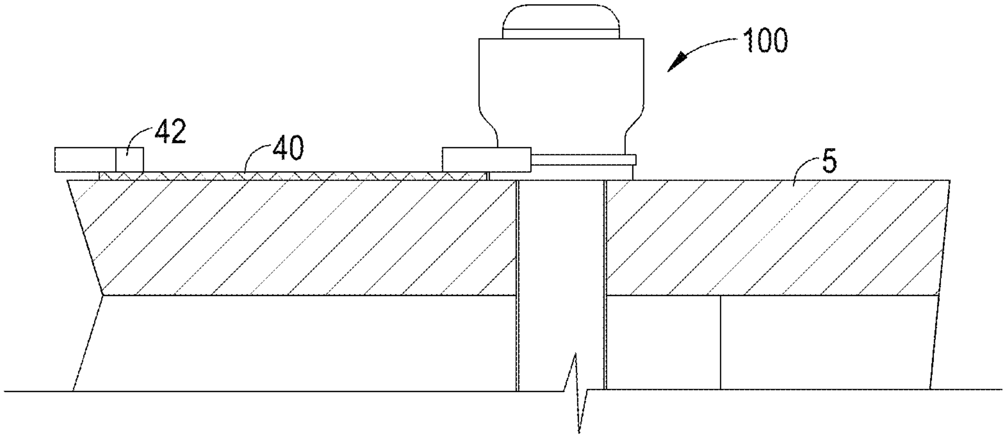
FIG. 15 is a schematic sectional view of a roof structure including a powered ventilator.

In addition to or as an alternative to the tube 10, mat 20, or ring 30 positioned inside the airflow path of the updraft ventilator 100, or the tube 10 or mat 20 positioned inside the catchment trough 146, a mat 40 may be positioned on the roof structure 5, adjacent the catchment trough 146. This is shown, for example in FIGS. 15 and 16. In one example the mat 40 may be secured by weights 42 such as the illustrated bricks. The example mat 40 is approximately 0.9 m×0.9 m square, but various sizes could be used. This mat 40 can be helpful in situations where FOG runs over the catchment trough 146 because the trough mat 20 is fully absorbed and can't hold any more FOG. This can occur if the roof structure is not cleaned frequently enough. The mat 40 thus serves as a "back up" to protect the roof.

The following step by step process is expected for typical use and implementation of the FOG absorbent product and collection process. The process is explained with reference to the tube 10, but will be essentially the same when using the mat 20 or ring 30.

STEP 1: Introduce the tube 10 with selected absorbent material such as sphagnum peat "SP" or mushroom compost into the updraft ventilator 100. Secure the tube 10 so that it stays in a desired position for FOG collection. Optionally, prior to placement, weigh the dry tube 10 so that a "before and after" measure of FOG collection can be established.

STEP 2: set up a regular interval to remove and replace the FOG collection absorbent tube 10.

STEP 3: Depending on the interval for removal and collection of the FOG absorbent tube 10, arrange for storage in covered and secured FOG containers to avoid attracting small animals and rodents that are common in and around restaurants.

STEP 4: Transport and dispose of the FOG absorbent tube 10, mat 20 or other suitable container to a regulated, Subtitle D lined disposal facility, or to a sewage sludge incinerator (SSI). If disposed of at an SSI facility, the FOG tube 10 is then part of waste to energy, renewable energy fuel source.

The advantage of the FOG process using the tube 10 or mat 20 is that it safely and cost effectively separates FOG in the updraft ventilator 100 and/or catchment trough 146 before it is discharged to the environment, deposited on the surfaces of the updraft ventilator 100, and/or mixed with rainwater. Separation after the fact is difficult and expensive.

The FOG absorbent tube 10 works for FOG collection because the sphagnum peat "SP" or mushroom compost materials are highly absorbent natural materials that separate the FOG from liquids or water. The absorbing characteristics are a combination of increased surface area and natural filtering processes, similar to that provided by charcoal or activated carbon. A slightly larger AOS in the filtering geotextile fabric 12 will allow more of the natural absorbing and geochemical attraction between the sphagnum peat "SP" to have better contact with the surface FOG materials to attract and collect it from the liquids/water. This approach reduces the tendency for emulsification of the FOG where water is present.

Collecting the FOG substantially reduces the volume of mixed FOG and liquids that are the cause of significant maintenance problems in sewer systems, and the cause of difficult to apply sludge materials that are typically utilized on farmland. FOG offer little or no benefit for improving macro and micro nutrients on farmland because it is resistant to biodegradation and has little or no nitrogen, phosphorus, and potassium (i.e. PKN). See Use of Peat in the Treatment of Oily Waters, G. N. Mathavan & T. Viraraghavan, 1989.

Polar molecules have a positive charge on one end and a negative charge on the other end. Non-polar molecules do not have two electrical poles and the electrons are distributed symmetrically on both sides. FOG is composed of organic non-polar compounds. Water is a polar solvent. Only polar compounds or other polar solvents will mix with water. Therefore, non-polar FOG will not readily mix with water. Depending on the source, FOG has a density of approximately 0.863-0.926 g/cm$^3$. Water has a density of approximately 1.000 g/cm$^3$. The lesser density will float on top of the greater density substance if it does not mix, thus non-polar FOG floats on water because it does not mix and gravity exerts more pull on the greater density water molecules. Water molecules are relatively small because they are only composed of one oxygen and two hydrogen molecules (H2O). They therefore pack closely together in a space. Molecules of oil are large and have complicated shapes, thus requiring more space than water molecules. This is why oil is less dense than water.

A few oils having densities less than water are known to be polar compounds and can mix with water and therefore not float on the water's surface.

Thus, polarity and density both contribute to oil floating on water.

Polarity is a relative term. On a sliding scale, some oils are more or less polar than others are and have both polar and non-polar attributions Also, the heating of oils and interaction with other organic compounds it is exposed to during heating, can change the oil's chemical composition, and thus change the relative polarity.

The above referenced principles permit the method of this application to work as intended and as developed.

Further evidence supporting the "charge" principle is found at Fats. Oil and Grease Science, Dothan. Ala. Fats, Oils, and Grease (FOG) Science www.dothan.org/DocumentCenter/View/3032/FOG---Science?bidID=

Once trapped in the tube or mat, the product can be easily and compactly shipped to a location for disposal, incineration or further processing, including processing the materials for use as fuel.

The foregoing has described an apparatus and method for collection and disposal of fats, oil and grease. All of the features disclosed in this specification, and/or all of the steps of any method or process so disclosed, may be combined in any combination, except combinations where at least some of such features and/or steps are mutually exclusive.

Each feature disclosed in this specification may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends, or to any novel one, or any novel combination, of the steps of any method or process so disclosed.

What is claimed is:

1. A method of capturing and disposing of fats, oil and/or grease, the method comprising the steps of:

positioning an updraft ventilator in flow communication with a source of airflow having fats, oils, and/or grease entrained therein, wherein:

the enclosure of the updraft ventilator includes a curb cap, a hood band positioned above the curb cap, and a wind band surrounding and spaced away from the hood band;

collectively, the lower part of the hood band and the wind band define a duct; and collectively, a lower part of the wind band and the curb cap define a bowl positioned below the duct;

providing a porous container formed of a porous fabric filled with an absorbent material capable of absorbing a quantity of the fats, oil, and/or grease through the porous fabric of the porous container;

placing the porous container and the absorbent material contained therein in an enclosure of the updraft ventilator;

operating the updraft ventilator to draw the airflow having fats, oils, and/or grease entrained therein through the enclosure such that it contacts the porous container;

allowing the porous container to fill up with at least one of fats, oil, and/or grease; and after a period of time, removing the porous container from the updraft ventilator.

2. The method of claim 1, wherein the porous container is an elongated tube, mat, or ring disposed within the duct of the enclosure.

3. The method of claim 1, wherein:

The porous container is an elongated tube, mat, or ring disposed within the bowl of the enclosure.

4. The method of claim 1, wherein the wind band includes a drain tube positioned to permit liquid to flow away from the bowl by gravity.

5. The method of claim 4, further comprising a catchment trough positioned adjacent to the curb cap and located such that it can receive liquid from the drain tube by gravity flow.

6. The method of claim 5, wherein the porous container is an elongated tube or mat disposed within the catchment trough.

7. The method of claim 5, further comprising placing a porous container in the form of a mat on a roof structure adjacent the catchment trough, wherein the porous container is formed of a porous fabric filled with an absorbent material capable of absorbing a quantity of the fats, oil, and/or grease through the porous fabric of the porous container.

8. The method of claim 1, further comprising securing the porous container to the enclosure using a retention device.

9. The method of claim 1, wherein the porous container is a ring disposed within the duct and having a flange engaging the housing so as to suspend the ring in the enclosure.

10. The method of claim 1, wherein the porous container comprises a plurality of pores with an apparent opening size (AOS) of 0.25 mm to 0.5 mm, and wherein the porous container is filled with an absorbent material capable of absorbing a quantity of the fats, oil, and/or grease through the porous fabric of the porous container, wherein the absorbent material is selected from the group consisting of sphagnum peat, mushroom compost, and combinations thereof.

11. An apparatus for capturing and disposing of fats, oil and/or grease, comprising:

an updraft ventilator in flow communication with a source of airflow having fats, oils, and/or grease entrained therein;

the updraft ventilator having an enclosure including a curb cap, a hood band positioned above the curb cap, and a wind band surrounding and spaced away from the hood band;

collectively, the lower part of the hood band and the wind band define a duct; and collectively, a lower part of the wind band and the curb cap define a bowl positioned below the duct; and a porous container disposed within the enclosure, the porous container formed of a porous fabric filled with an absorbent material capable of absorbing a quantity of the fats, oil, and/or grease through the porous fabric of the porous container.

12. The apparatus of claim 11, wherein the porous container is an elongated tube or mat disposed within the duct of the enclosure.

13. The apparatus of claim 11, wherein:

The porous container is an elongated tube or mat disposed within the bowl of the enclosure.

14. The apparatus of claim 11, wherein the wind band includes a drain tube positioned to permit liquid to flow away from the bowl by gravity.

15. The apparatus of claim 14, further comprising:

a catchment trough positioned adjacent to the curb cap and located such that it can receive liquid from the drain tube by gravity flow; and a porous container disposed in the catchment trough, the porous container formed of a porous fabric filled with an absorbent material capable of absorbing a quantity of the fats, oil, and/or grease through the porous fabric of the porous container.

16. The apparatus of claim 15, further comprising a porous container in the form of a mat positioned on a roof structure adjacent the catchment trough, wherein the porous container is formed of a porous fabric filled with an absorbent material capable of absorbing a quantity of the fats, oil, and/or grease through the porous fabric of the porous container.

17. The apparatus of claim 11, further comprising a retention device securing the porous container to the enclosure.

18. The apparatus of claim 11, wherein the porous container is a ring disposed within the duct and having a flange engaging the enclosure so as to suspend the ring in the enclosure.

19. The apparatus of claim 11, wherein the porous container comprises a plurality of pores with an apparent opening size (AOS) of 0.25 mm to 0.5 mm, and wherein the porous container is filled with an absorbent material capable of absorbing a quantity of the fats, oil, and/or grease through the porous fabric of the porous container, wherein the absorbent material is selected from the group consisting of sphagnum peat, mushroom compost, and combinations thereof.

* * * * *